(12) United States Patent
Maffe et al.

(10) Patent No.: US 10,952,447 B1
(45) Date of Patent: Mar. 23, 2021

(54) APPARATUS FOR THAWING FROZEN FOOD

(71) Applicants: Michael Sergio Maffe, Woodland Hills, CA (US); Dylan Charles Wolff, Los Angeles, CA (US)

(72) Inventors: Michael Sergio Maffe, Woodland Hills, CA (US); Dylan Charles Wolff, Los Angeles, CA (US)

( * ) Notice: Subject to any disclaimer, the term of this patent is extended or adjusted under 35 U.S.C. 154(b) by 345 days.

(21) Appl. No.: 16/029,623

(22) Filed: Jul. 8, 2018

Related U.S. Application Data

(62) Division of application No. 15/589,786, filed on May 8, 2017, now Pat. No. 10,258,055.

(51) Int. Cl.
*A23B 4/07* (2006.01)
*A23L 3/365* (2006.01)

(52) U.S. Cl.
CPC ............... *A23B 4/07* (2013.01); *A23L 3/365* (2013.01); *A23V 2002/00* (2013.01)

(58) Field of Classification Search
CPC .................................. A23B 4/07; A23L 3/365
See application file for complete search history.

(56) References Cited

U.S. PATENT DOCUMENTS

| 2,214,009 | A | * | 9/1940 | Boester, Jr. | ............. | F25D 17/02 |
| | | | | | | 62/376 |
| 3,754,652 | A | * | 8/1973 | Franklin | ................. | B01D 35/26 |
| | | | | | | 210/167.28 |
| 3,859,981 | A | * | 1/1975 | Yoshida | ................... | A47J 29/02 |
| | | | | | | 126/374.1 |
| 4,062,277 | A | | 12/1977 | Powers | | |
| 5,665,412 | A | | 9/1997 | Fuller et al. | | |
| 6,691,608 | B1 | | 2/2004 | Thompson | | |
| 2013/0062038 | A1 | | 3/2013 | Pearson | | |
| 2015/0007588 | A1 | * | 1/2015 | Cantrell | ................... | A23L 3/365 |
| | | | | | | 62/56 |
| 2015/0135974 | A1 | * | 5/2015 | Ambrosi | ................. | A47J 36/24 |
| | | | | | | 99/483 |

* cited by examiner

*Primary Examiner* — Ibrahime A Abraham
*Assistant Examiner* — John J Norton
(74) *Attorney, Agent, or Firm* — Minta Law Group LC

(57) ABSTRACT

A method for thawing frozen foods by recycling the water that is used to thaw the frozen foods. Food is first placed inside of a container and then water is pumped from the bottom of the container where the water is heated and by use of a pump and natural rise of heat allowed to flow around the food. When the water reaches the top of the container, it spills over the top and is pumped back into the bottom of the container as a continuous process until the food is thawed.

12 Claims, 7 Drawing Sheets

APPARATUS FOR THAWING FROZEN FOOD

CROSS-REFERENCE TO RELATED APPLICATION'S

This patent application is a divisional application of non-provisional application Ser. No. 15/589,786 filed on May 8, 2017 now pending, claiming priority to Provisional Application Ser. No. 62/334,901 filed on May 11, 2016.

BACKGROUND OF THE INVENTION

1. Field of the Invention

The present invention relates to the field of thawing frozen food, primarily meat, for preparing unthawed food to be served in commercial establishments such as restaurants.

2.1 General Background

It is common in the food industry to store food, especially meat, in a frozen condition until it is ready to be cooked. In general, the thawing process used in most restaurants is to place the frozen food, usually individually vacuum sealed, in a sink and permit water to flow over the frozen food until the frozen food is thawed. Water runs down the drain hole in the sink after the water has passed over the frozen food in the sink. The thawing process takes several hours. The process results in an enormous waste of water.

2.2 Description of the Prior Art

The following 6 patents and published patent applications are the closest prior art known to the inventors.

1. U.S. Pat. No. 4,062,277 issued to Gilbert L. Powers on Dec. 13, 1977 for "Defrosting Apparatus".
2. U.S. Pat. No. 5,665,412 issued to Robert Fuller et al. on Sep. 9, 1997 for "Method for Thawing Frozen Food".
3. U.S. Pat. No. 6,691,608 issued to Brett D. Thompson on Feb. 17, 2004 for "Frozen Food Thawing Device".
4. United States Published Patent Application No. 2013/0062038 to Christopher E. Pearson on Mar. 14, 2013 for "Method and Device for Thawing Frozen Substances".
5. United States Published Patent Application No. 2015/0007588 to John Cantrell et al. on Jan. 8, 2015 for "Defrost Apparatus and Method Thereof".
6. United States Published Patent Application No. 2015/0135974 to Rudy Ambrosi et. al. on May 21, 2015 for "Recirculating Water Defroster".

SUMMARY OF THE INVENTION

The present invention is an apparatus for thawing frozen foods by recycling the water that is used to thaw the frozen foods. Food is first placed inside of a container. Water is then pumped from the bottom of the container where the water is heated and, by use of a pump and natural rise of heat, allowed to flow around the food. When the water reaches the top of the container, it spills over the top and is pumped back into the bottom of the container as a continuous process until the food is thawed.

In one embodiment of the present invention, a sink drain hole is plugged and the present invention apparatus is placed into the sink. After the allotted thawing time has been accomplished as discussed below, the drain plug is removed, water flows down the drain, and fresh water is poured into the sink and container. In a second embodiment, the present invention container is inside a second outer container. After the allotted thawing time has been accomplished as discussed below, the water is drained from both buckets and fresh water is poured into the two buckets.

It is an object of the present invention to have an apparatus for thawing food where during the thawing process the water flows from a lower elevation to a higher elevation within a container during the thawing process.

It is also an object of the present invention to have a pump that performs the function of recycling the water.

It is an additional object of the present invention to have a large container that is placed in a sink with a stopper in the sink drain hole and the container filled with room temperature water. The container is then allowed to overflow with water.

It is a further object of the present invention to provide an apparatus for restaurants that receive frozen and vacuum-sealed food to thaw the food. First, all the food is placed in the container. Then the container is filled with water and thereafter filled to a level where the water elevation within the container is higher than the elevation of the pump.

It is still a further object of the present invention to provide a container with a water pump affixed to the outside of the container that pumps water from outside of the container to the inside at a location adjacent the bottom of the container. This water is then heated and allowed to flow upward through the container to thaw the food within the container. The container may have holes near the top of the container for water to flow out of the container through the holes. If the container has no holes, then the water within will exit the container as it overflows over the top edge of the container.

It is a further object of the present invention to provide a submersible heating element that is affixed to the side of the container that heats the water as it enters the container from the bottom. The heater has a thermostat to set the water temperature at a predetermined temperature. A preferred temperature is 68 degrees Fahrenheit. In no event should the water temperature ever exceed 70 degrees Fahrenheit. When the water reaches the set temperature, the heater shuts off until the water gets cold again and then it reheats.

It is a further object of the present invention to provide an alarm to alert that two hours have passed. This device could also be installed with an automatic shutoff after two hours. Many existing retail codes require that frozen food may be thawed by completely submerging under potable running water for a period not to exceed two hours at a water temperature of 70 Fahrenheit or below, and with sufficient water velocity to agitate and flush off loose particles into the sink drain. Therefore, the present invention will assist restaurants and noncommercial users in complying with this food safety requirement. After two hours the water should be changed to prevent the growth of bacteria.

At the end of the thawing process, the food goes from a thawed state to an unthawed state. Typically the de-thawing is done all at once and therefore the food is ready for cooking or if not ready to be cooked immediately, is placed into a refrigerator be kept cold.

It is still a further object of the present invention to provide a process that helps to thaw all portions of the food, not just the top and bottom portions. Since the heat transfer is taking place from the submersible heater, this aids in thawing all portions of the food. This is a key innovation of the present invention. Further, the benefit of having the heat come from the bottom is that it captures the warmer water from the top and heat rises so it goes up as opposed to previous prior art devices which simply shower the food and therefore do not allow the warm water to reach the bottom of the container.

It is still a further object of the present invention to provide a container that has a typical length of 12 inches and width of 12 inches and a height that is between 12 inches and 24 inches. However, it is within the spirit and scope of the present invention to be of a multitude of sizes and shapes with the caveat that the present invention should be designed to fit within a standard sized restaurant sink.

It is still a further object of the present invention to provide handles on the container so that the container can be easily removed and/or lifted out of the sink.

In an alternative embodiment, instead of using a sink, the container which is essentially the same as the container identified above is set within a second container so that it is dual container assembly. Therefore, instead of having to place the container inside a sink, the container is placed inside an exterior container and then after the two hours are concluded, the water from the interior container is drained into the exterior container and entirely discarded. The device works essentially the same way as the first embodiment but instead of having the requirement of placing the container inside a sink, that is eliminated and instead, the container is placed inside an exterior container to avoid the necessity of having to lift the container in and out of a sink.

Further novel features and other objects of the present invention will become apparent from the following detailed description, discussion and the appended claims, taken in conjunction with the drawings.

BRIEF DESCRIPTION OF THE DRAWINGS

Referring particularly to the drawings for the purpose of illustration only and not limitation, there is illustrated.

DETAILED DESCRIPTION OF EMBODIMENTS OF THE PRESENT INVENTION

Although specific embodiments of the present invention will now be described with reference to the drawings, it should be understood that such embodiments are by way of example only and merely illustrative of but a small number of the many possible specific embodiments which can represent applications of the principles of the present invention. Various changes and modifications obvious to one skilled in the art to which the present invention pertains are deemed to be within the spirit, scope and contemplation of the present invention as further defined in the appended claims.

Figure 1:
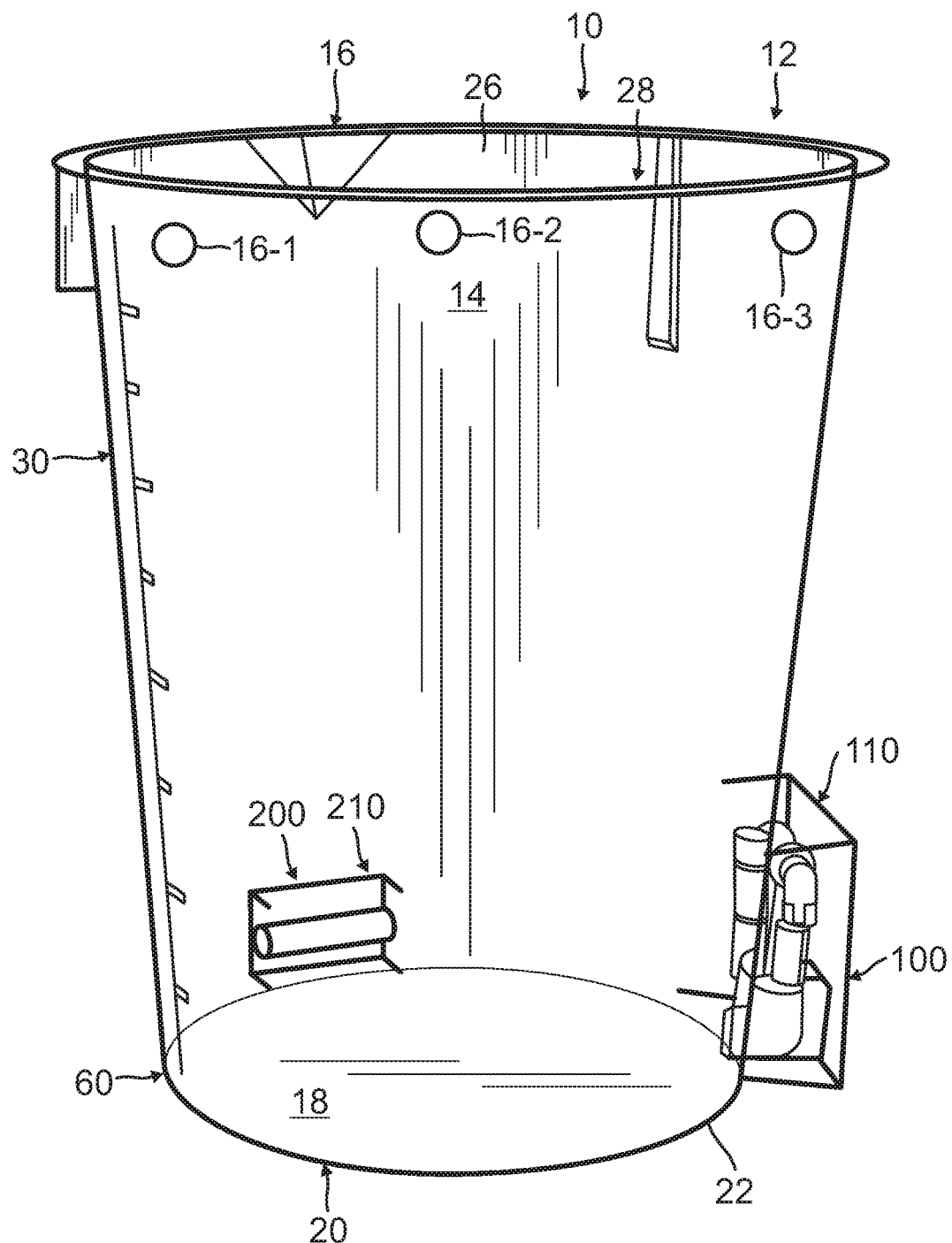
FIG. 1 is a front elevational view of a first embodiment of the present invention illustrating a food thawing container having a submersible water pump within a casing affixed to the outside of the container and a heating element within a separate casing affixed to the outside of the container.

Referring to FIG. 1, there is illustrated a front elevational view of a first embodiment of the present invention food thawing container 10 having a submersible water pump 100 within a casing 110 enclosing water pump 100. The casing or enclosure 110 is affixed to the exterior circumferential wall 14 and a heating element 200 within a heating element casing or enclosure encasing 210 affixed to the exterior circumferential wall 14 of the food thawing container 10. Further illustrated in FIG. 1, food thawing container 10 has a top circumferential edge 12, a top overflow spout 16, a bottom interior surface 18, a bottom exterior surface 20, an upper portion 30, a lower portion 60, a bottom circumferential edge 22, an interior circumferential wall 26, an exterior circumferential wall 14, and an interior chamber 28. Instead of an overflow spout 16, the container can have a multiplicity of draining members such as 16-1, 16-2 and 16-3 which are drain openings located adjacent the top of the container 14.

Figure 2:
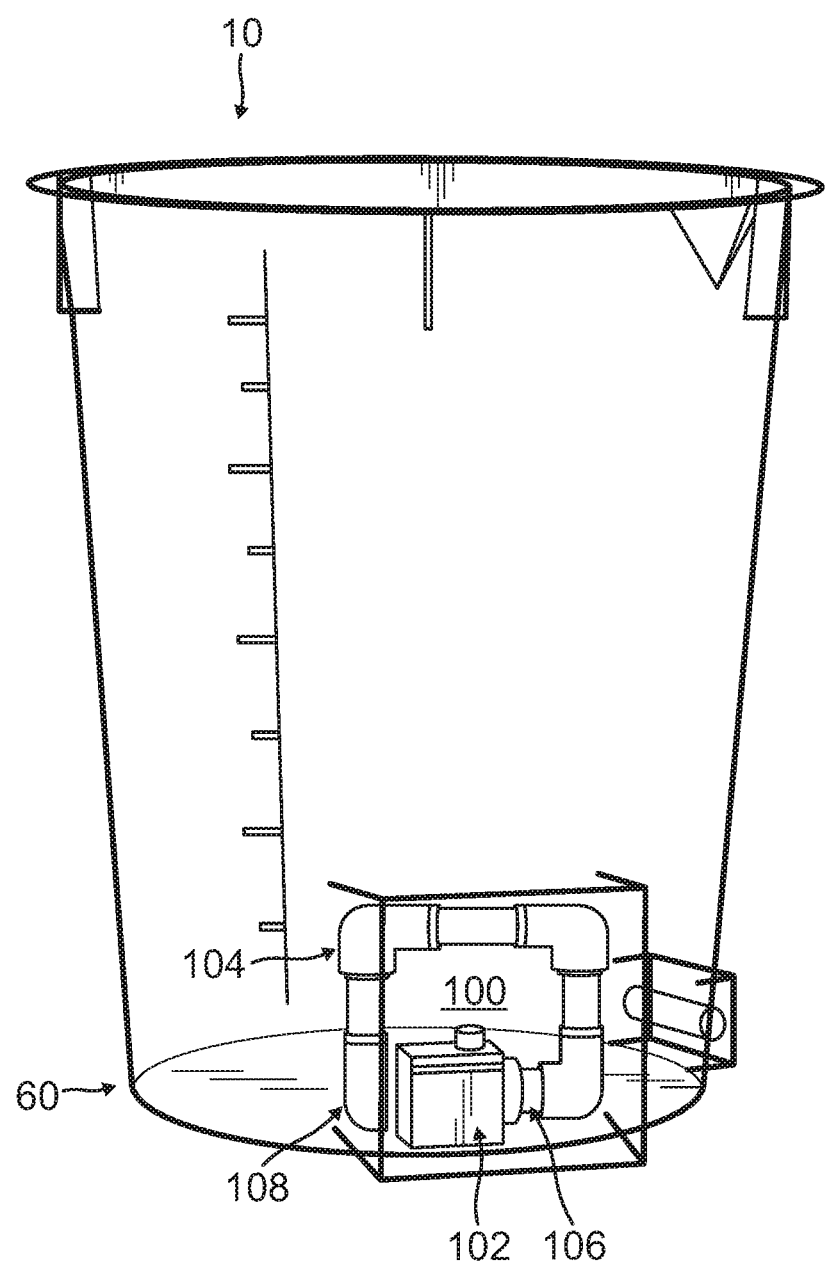
FIG. 2 is a right side elevational view of the first embodiment of the present invention illustrating a food thawing container having a submersible water pump within a casing affixed to the outside of the container and a heating element within a casing affixed to the outside of the container.

Referring to FIG. 2, there is illustrated a right front elevational view of the present invention food thawing container 10 having a submersible water pump 100 on the lower portion 60 of exterior circumferential wall 14 within casing 110. Submersible water pump 100 has an intake valve 102 that connects to a discharge line 104 which is made of material selected from the group consisting of polyvinyl chloride (PVC) pipe, rubber hose, isoprene, metal or derivatives thereof. The intake valve 102 of the submersible water pump 100 is a one way intake valve. Discharge line 104 includes a line intake section 106 and a line exit section 108. Line exit section 108 is directed towards bottom interior surface 18 of food thawing container 10.

Figure 3:
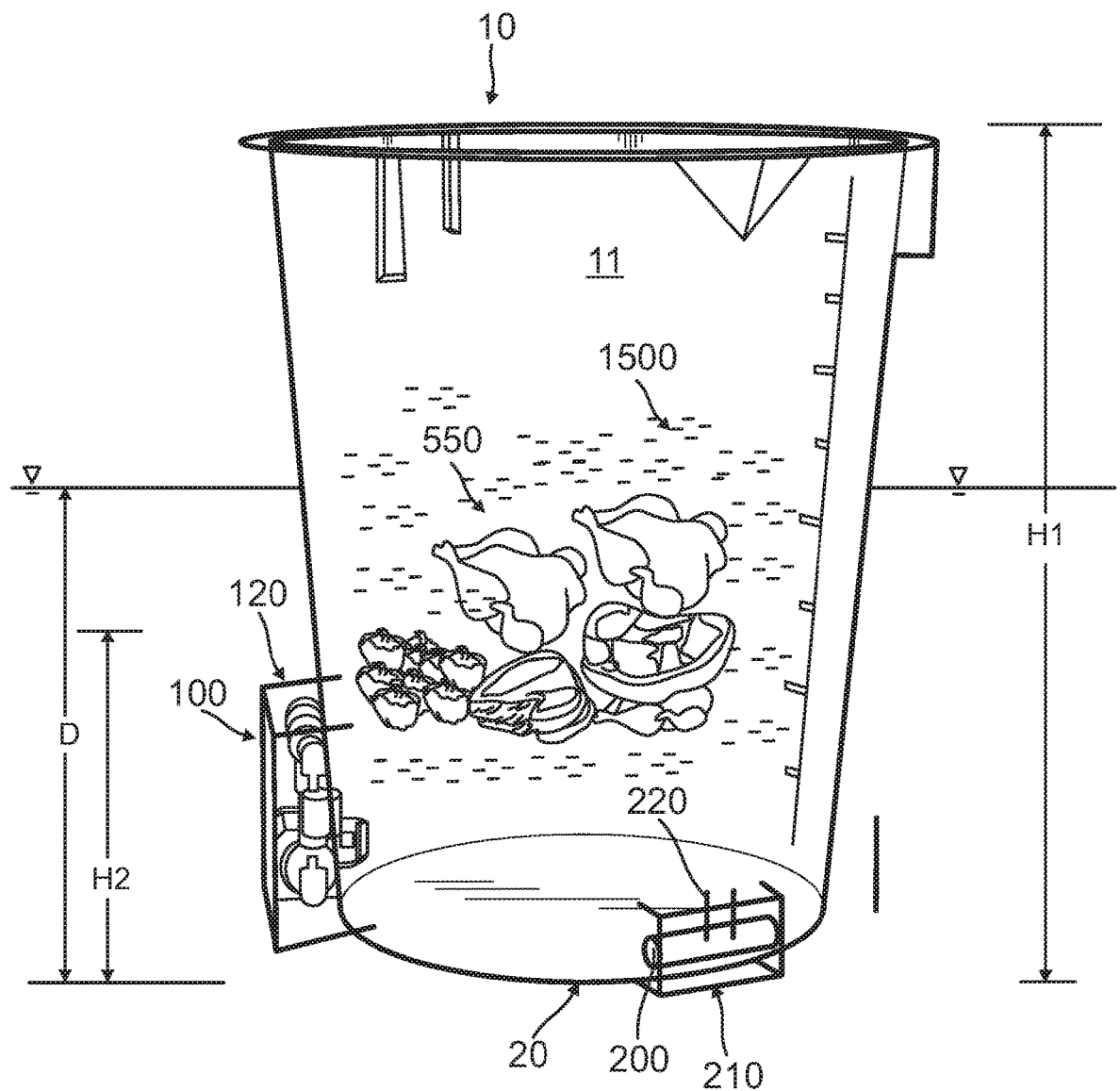
FIG. 3 is a left side elevational view of the first embodiment of the present invention illustrating a food thawing container having a submersible water pump within a casing affixed to the outside of the container and a heating element within a casing affixed to the outside of the container.

Referring to FIG. 3, there is illustrated a left front elevational view of the present invention food thawing container 10 having a heating element 200 on the lower portion 60 of exterior circumferential wall 14. Heating element 200 is encased within heating element encasing 210. Heating element 200 can be controlled by a temperature thermostat to heat water outsider the container 10 to be heated to a desired temperature of water to be used to thaw the food contained in food thawing container 10. Many existing government retail codes require that frozen food may be thawed by completely submerging it under potable running water for a period not to exceed two hours at a water temperature of 70 degrees Fahrenheit or below, and with sufficient water velocity to agitate and flush off loose particles into the sink drain. Therefore, it is not only desirable to have a water temperature that is 70 degrees Fahrenheit or below, but a requirement in the retail industry in California. The present invention temperature thermostat allows a multitude of temperatures that enables the user to comply with a desired or required temperature.

Further referring to FIG. 3, frozen food which may be vacuum sealed 660 is placed into the interior chamber 11 of container 10. In addition, thereafter, water 1500 is pumped from outside container 10 through exterior wall 14 into interior chamber 11 through discharge line 108 from pump 100. The horizontal flow of water 1500 creates a centrifugal force. The water will continue to flow upwardly within interior container 11 by means of heat tending to move from an area of higher temperature to an area of lower temperature. When the water rises to an elevation near inner top circumferential edge 12 of container 10, the water will flow from back into a sink (see FIG. 5) by means of inner top overflow spout 16. This creates a circular flow of water using the same volume of water within present invention food thawing container 10. This volume of water will continue to thaw frozen food 550 by heated water flowing from inner lower portion 60 to the inner top circumferential edge 12. This process is continued until a desired time set by the user. This time can be controlled by existing government retail codes or by a time determined by a different set of criteria.

Figure 4:
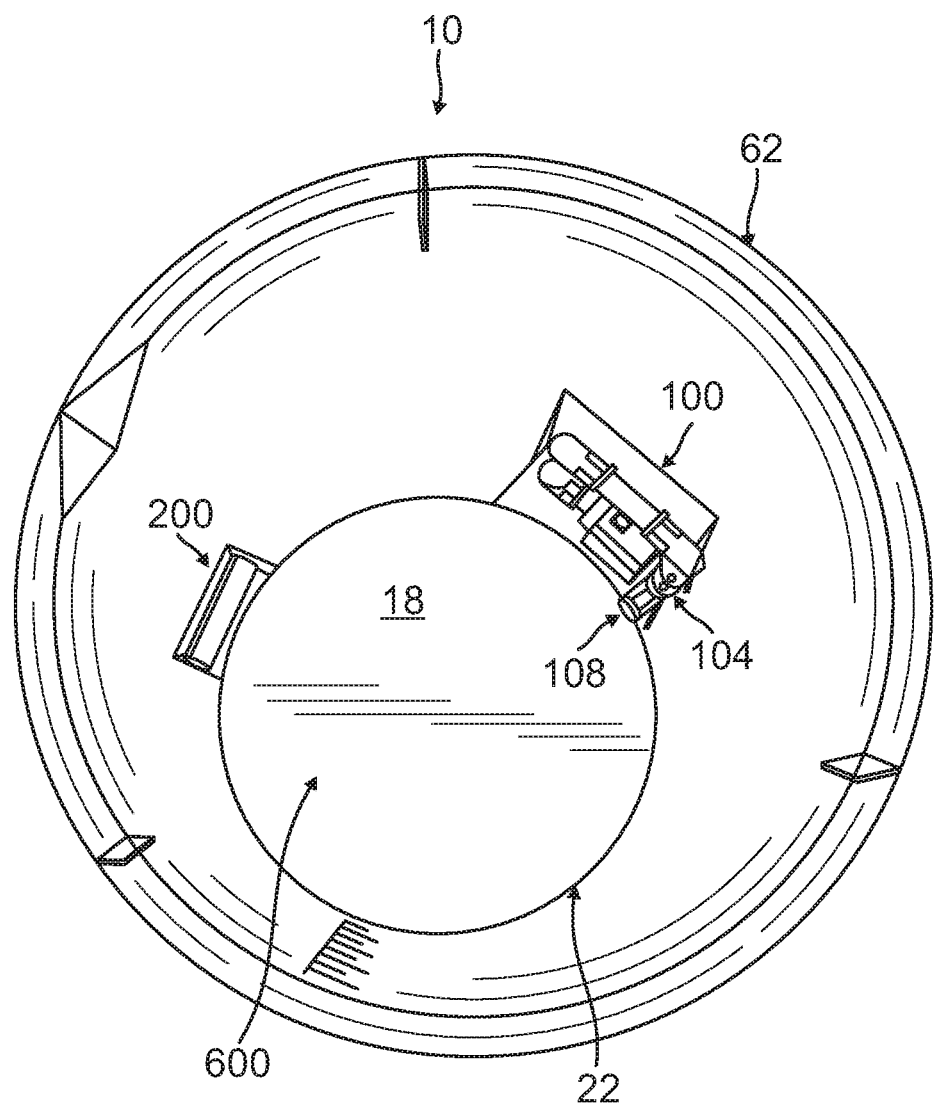
FIG. 4 is a top view of the first embodiment of the present invention illustrating a food thawing container having a submersible water pump within a casing affixed to the outside of the container and a heating element within a casing affixed to the outside of the container.

Referring to FIG. 4, there is illustrated a top view of the present invention food thawing container 10 having submersible pump 100 and a heating element 200 shown to be outside of bottom circumferential edge 22. Also illustrated is top circumferential edge 12 and bottom interior surface 18.

Figure 5:
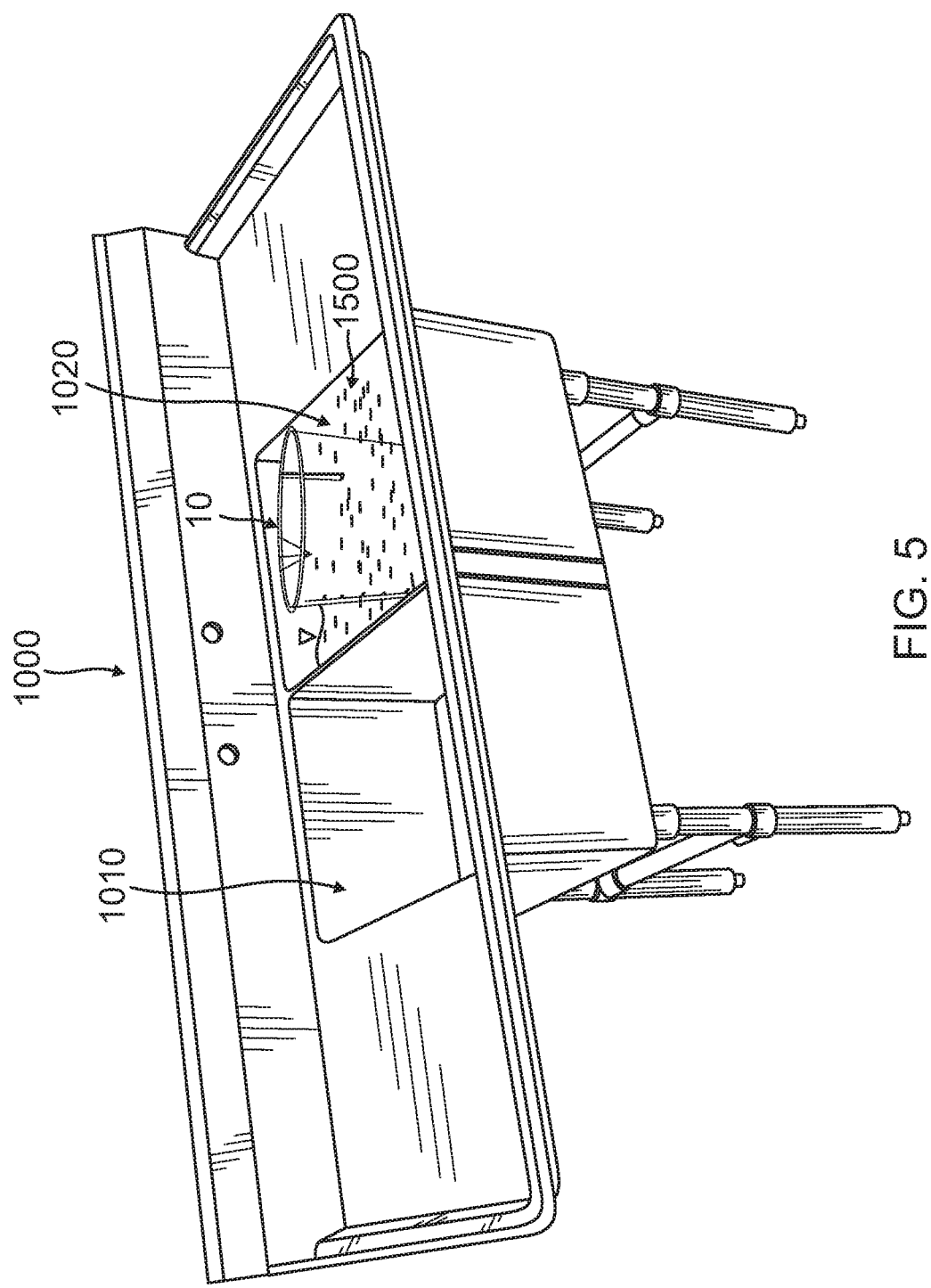
FIG. 5 is a top-front perspective view of a dual commercial sink with the first embodiment of the present invention food thawing container placed within one of the sinks.

Referring to FIGS. 3, 4, and 5, there is illustrated line exit section 108 of discharge line 104 that is the exit point of the water that moves from outside of food thawing container 10 and flows onto bottom interior surface 18 of food thawing container 10. As shown in FIG. 5, the present invention food thawing container 10 is designed to be placed into a sink or commercial sink 1000. A stopper (not shown) is used to plug a drain opening in the sink to prevent water from flowing out of the sink through a drain pipe. Right sink 1020 is then filled with water up to an elevation D (FIG. 3) that is greater than the height H2 of pump encasing top surface 120 of pump encasing 110 but not greater than the depth of the sink being used. The present invention thawing container 10 has a height H1 which preferably is not taller than the sink is deep.

In operation, submersible water pump 100 moves water 1500 that is outside of food thawing container 10 and within a right sink 1020 from outside of food thawing container 10 and into food thawing container 10. The water 1500 flows from outside of food thawing container 10 where it is heated by heating element 200 to a desired temperature set by thermostat 220 (see FIG. 3) and then pumped into food thawing container 10. While within food thawing container 10, water 1500 flows upwardly through the food thawing container 10 passing around food 550 (which may be vacuum sealed).

The present invention is designed to have a pump that produces a velocity of water that is sufficient to comply with current government retail codes. Further, the present invention is an improvement over the prior art since heat within matter naturally rises. This phenomenon common in the laws of thermodynamics states that heat tends to move from an area of higher temperature to an area of lower temperature. Therefore, within the present invention food thawing container 10 working in conjunction with a sink system, water will flow from the interior bottom surface 18 to top circumferential edge 12 and then flow out of food thawing container 10 by means of top overflow spout 16 and return to right sink 1020 and/or outside of food thawing container 10. This process is continued until a desired time set by the user. This time could be controlled by existing government retail codes or a time determined by a different set of criteria.

Figure 6:
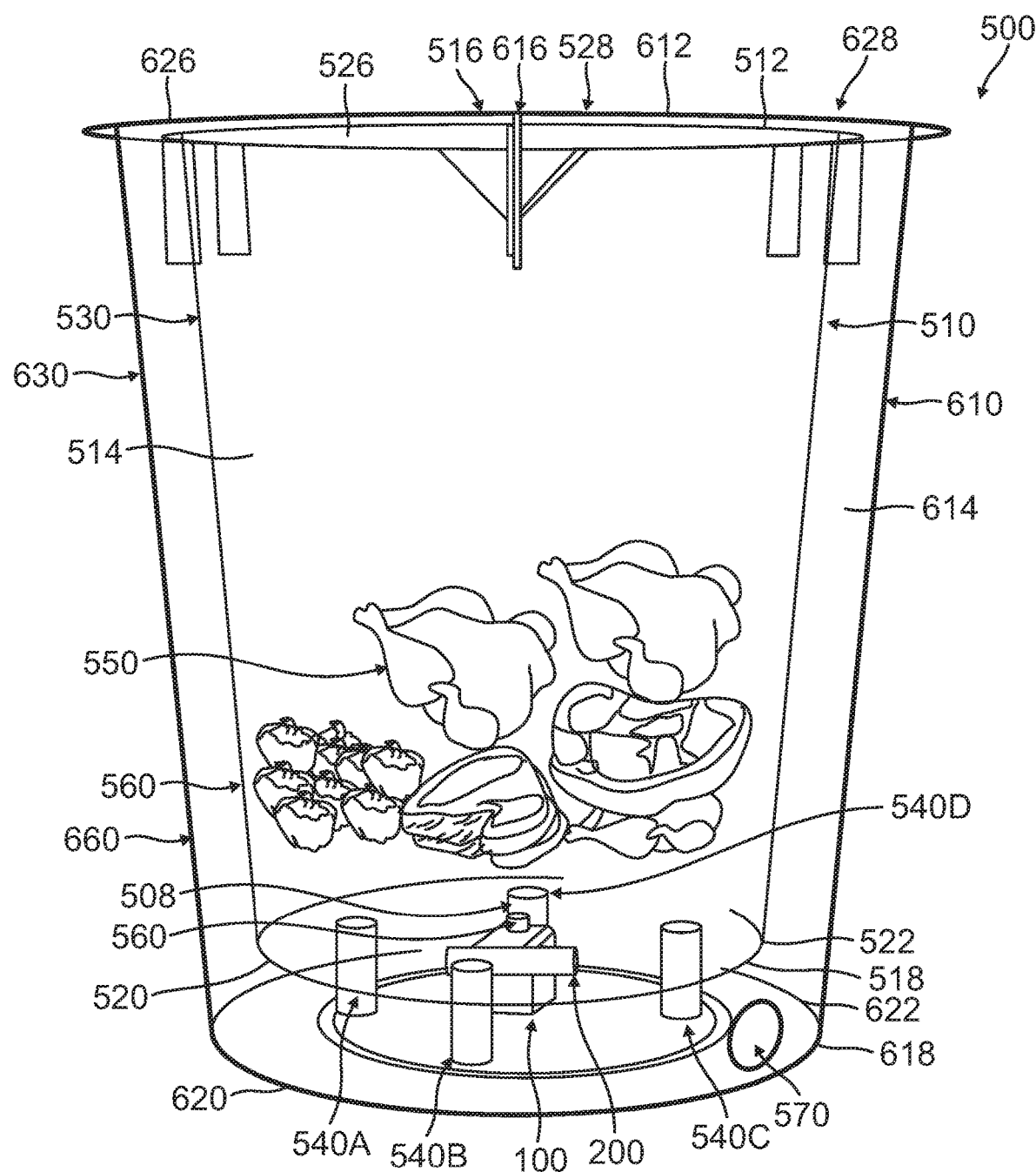
FIG. 6 is a right front elevational view of a second embodiment of the present invention illustrating a dual food thawing container having an interior container and an exterior container with a submersible water pump and heating element positioned between the interior container and the exterior container.
Figure 7:
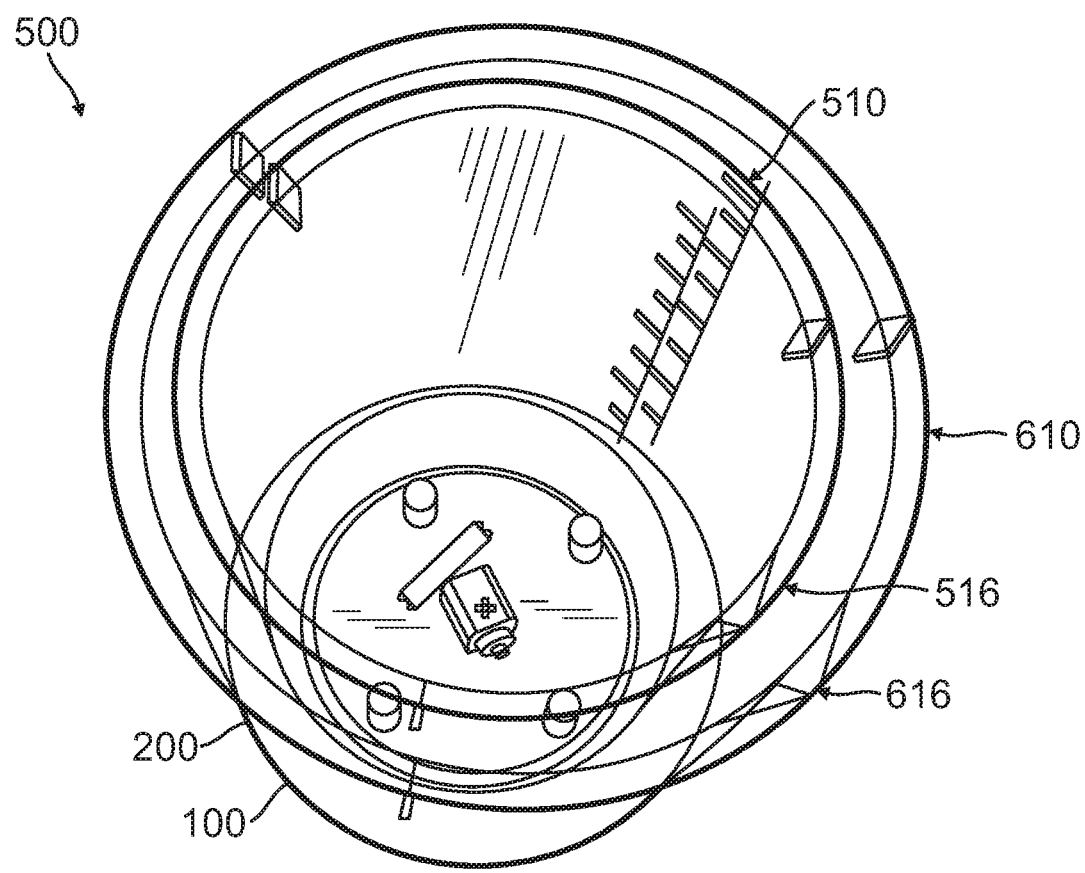
FIG. 7 is a top view of the second embodiment of the present invention illustrating a dual food thawing container having an interior container and an exterior container with a submersible water pump and heating element positioned between the interior container and the exterior container.

Referring to FIGS. 6 and 7, there is illustrated a second embodiment of the present invention dual food thawing container 500. The second embodiment dual food thawing container 500 consists of a dual interior container 510 and a dual exterior container 610. The use of a two-container system will allow the flow of water between containers and thaw food without the need for a sink to place the container into as was the case in the first embodiment.

Dual interior container 510 has an inner top circumferential edge 512, a inner top overflow spout 516, an inner bottom interior surface 518, an inner bottom exterior surface 520, an inner upper portion 530, an inner lower portion 560, an inner bottom circumferential edge 522, an inner interior circumferential wall 526, an inner exterior circumferential wall 514, and an inner interior chamber 528.

Further referring to FIG. 6, there is illustrated frozen food 550 within dual interior container 510 of dual food thawing container 500. Also illustrated in FIG. 6 are support posts 540A, 540B, 540c, and 540D which support dual interior container 510 above dual exterior container 610. Located in between dual interior container 510 and dual exterior container 610 are submersible pump 100 and heating element 200. There is also illustrated in FIG. 6, dual exterior container 610 having an outer top circumferential edge 612, an outer top overflow spout 616, an outer bottom interior surface 618, an outer bottom exterior surface 620, an outer upper portion 630, an outer lower portion 660, an outer bottom circumferential edge 622, an outer interior circumferential wall 626, an outer exterior circumferential wall 614, and an outer interior chamber 628.

Referring to FIGS. 6 and 7, frozen food 550 while floating within dual interior container 510 will thaw faster and more evenly as the flow of water enters via a discharge line 508 that extends from submersible pump 100. In use, similar to the first embodiment, water is heated in dual exterior container 610 and then pumped into dual interior container 510 by means of submersible pump 100. The flow of water that has been heated in dual exterior container 610 then flows vertically out of discharge line 508 into inner lower portion 560 of dual interior container 510.

Discharge line 508 allows the flow of the water to enter into dual interior container 510 at a vertical angle. Also, there is a pump hole 560 that discharge line 508 passes through to enter dual interior container 510. To prevent leakage and back flow, a sealant is used to prevent water from flowing back through this hole into dual exterior container 610. The sealant may be a ring sealant or epoxy type sealant that fills the gap between pump hole 560 and discharge line 508.

Referring to FIGS. 6 and 7, similar to the first embodiment, the present invention second embodiment is an improvement over the prior art by utilization of the second law of thermodynamics which states that heat tends to move from an area of higher temperature to an area of lower temperature. Therefore, within second embodiment food thawing container 500, water is pumped from outer inner portion 660 of dual exterior container 610 into inner lower portion 560 of dual interior container 510. The water will then flow vertically upwards by means of discharge line 508 having a vertically pointed direction of flow. The water will continue to flow upwardly within dual interior container 510 by means of heat tending to move from an area of higher temperature to an area of lower temperature. When the water rises to an elevation near inner top circumferential edge 512 of dual interior container 510, the water will flow from dual interior container 510 back into dual exterior container 610 by means of inner top overflow spout 516. This creates a circular flow of water using the same volume of water within present invention dual food thawing container 500. This volume of water will continue to thaw frozen food 550 by heated water flowing from inner lower portion 560 to the inner top circumferential edge 512. This process is continued until a desired time set by the user. This time can be controlled by existing government retail codes or by a time determined by a different set of criteria.

The present invention food thawing container having the flow of water upwardly through the system from a constant heat source also improves the thawing of food in the center regions of the food and not just the outside portions. This is a vast improvement over the prior art which provides thawing of food via water in a top down manner.

Referring to FIGS. 6 and 7, typically, the distance between inner bottom interior surface 518 of dual interior container 510 and outer bottom interior surface 618 of dual exterior container 610 is approximately 5 inches to 12 inches. These dimensions are not limiting but typical. Similarly, the distance between the exterior circumferential wall dual interior container 510 and inner circumferential wall of dual exterior container 610 is approximately 2 to 3 inches. These dimensions are not limiting but typical.

For proper operation and to avoid cavitation, the present invention dual food thawing container 500 should have dual interior container 510 filled with water completely and dual exterior container 610 should have water at least above the submersible pump. Similarly, the preferred design is to have the height of dual exterior container 610 taller than the height of dual interior container 510. For draining of the system after use, there is a drain hole 570 that can be plugged and unplugged. Drain hole 570 will be water tight during operation and can be opened to remove the water from dual food thawing container 500 after use and prior to storage.

Of course the present invention is not intended to be restricted to any particular form or arrangement, or any specific embodiment, or any specific use, disclosed herein, since the same may be modified in various particulars or relations without departing from the spirit or scope of the claimed invention hereinabove shown and described of which the apparatus or method shown is intended only for illustration and disclosure of an operative embodiment and not to show all of the various forms or modifications in which this invention might be embodied or operated.

What is claimed is:

1. A container adapted for use in a sink and adapted to thaw frozen food, the container comprising:
    a. a top circumferential edge, a top overflow spout, a bottom interior surface, a bottom exterior surface, a lower portion, a bottom circumferential edge, an interior circumferential wall, an exterior circumferential wall, and an interior chamber bounded by the bottom interior surface and the interior circumferential wall;
    b. a submersible water pump retained in a casing affixed to said exterior wall of said container and adjacent said lower portion of said the container, the submersible water pump having at least an intake valve on the outside of said container and a discharge line extending through said exterior wall of said container, the discharge line having an opening facing into said interior chamber;
    c. a heating element retained in a casing affixed to said exterior wall of said container and adjacent said lower portion of said container; and
    d. wherein said container is adapted for retention in a sink with a plugged drain opening, the bottom circumferential edge of the container resting in the sink and the container extending upwardly relative to the sink, the container is adapted to be filled with water, the sink is adapted to be filled with water to a level above said submersible water pump and above said heating element, said submersible water pump recirculating water from the sink into said interior chamber with excess water in said interior chamber flowing through said pouring spout into said sink to be recirculated by the submersible water pump back into said container, said heating element set to heat said water in the sink to a temperature at or below seventy (70) degrees Fahrenheit;
    e. whereby, frozen food is inserted into said interior chamber and is thawed by continuous re-circulation of the heated water.

2. The container in accordance with claim 1, further comprising: said interior chamber having a cubic volume greater than 0.5 cubic feet.

3. The container in accordance with claim 1, further comprising: said top overflow spout is integrally affixed to said top circumferential edge.

4. The container in accordance with claim 1, further comprising: said discharge line of said submersible water pump is made of a material selected from the group consisting of: polyvinyl chloride, rubber, isoprene, and metal.

5. The container in accordance with claim 1, wherein the intake valve of the submersible water Dump is a one way intake valve.

6. The container in accordance with claim 1, further comprising:
    a. said container including a plugged drain opening; and
    b. wherein said water is recirculated for a maximum of two hours;
    c. whereby said opening in said container is unplugged and said drain opening in said sink is unplugged, water in said container and said sink is drained until said container and said sink are empty;
    d. whereby said opening in said container is plugged and said drain opening in said sink is plugged and said container is filled with fresh water and said sink is filled with fresh water to a level above said submersible water pump and above said heating element and said re-circulation process is continued for an additional maximum of up to two hours.

7. A container adapted for use in a sink and adapted to thaw frozen food; the container comprising:
    a. a top circumferential edge, a water draining member adjacent the top circumferential edge, a bottom interior surface, a bottom exterior surface, a lower portion, a bottom circumferential edge, an interior circumferential wall, an exterior circumferential wall, and an interior chamber bounded by the bottom interior surface and the interior circumferential wall;
    b. a submersible water pump adjacent said container, the submersible water pump having at least a member to draw in water in the sink and a member to cause the water from the sink to flow into said interior chamber of said container,
    c. a heating element retained adjacent said container; and
    d. wherein said container is adapted for retention in a sink with a plugged drain opening, the bottom circumferential edge of the container resting in the sink and the container extending upwardly relative to the sink, the container is adapted to be filled with water, the sink is adapted to be filled with water to a level above said submersible water pump and above said heating element, said submersible water pump recirculating water from the sink into said interior chamber with excess water in said interior chamber flowing through said pouring spout into said sink to be recirculated by the submersible pump back into said container, said heating element set to heat said water in the sink to a temperature at or below seventy (70) degrees Fahrenheit;

e. whereby, frozen food is inserted into said interior chamber and is thawed by continuous re-circulation of the heated water.

8. The container in accordance with claim 7, further comprising: said interior chamber having a cubic volume greater than 0.5 cubic feet.

9. The container in accordance with claim 7, further comprising: said draining member is at least one opening extending through said exterior wall adjacent said top circumferential edge.

10. The container in accordance with claim 7, wherein said member to cause the water from the sink to flow into said interior chamber of said container is made of a material selected from the group consisting of: polyvinyl chloride, rubber, isoprene, and metal.

11. The container in accordance with claim 7, wherein the member to draw in water in the sink is a one way intake valve.

12. The container in accordance with claim 7, further comprising:

a. said container including a plugged drain opening; and b. wherein said water is recirculated for a maximum of two hours;

c. whereby said opening in said container is unplugged and said drain opening in said sink is unplugged, water in said container and said sink is drained until said container and said sink are empty;

d. whereby said opening in said container is plugged and said drain opening in said sink is plugged and said container is filled with fresh water and said sink is filled with fresh water to a level above said submersible water pump and above said heating element and said re-circulation process is continued for an additional maximum of up to two hours.

\* \* \* \* \*